United States Patent
Cochran et al.

(10) Patent No.: US 11,151,658 B1
(45) Date of Patent: Oct. 19, 2021

(54) DYNAMIC LOCATION TRACKING ASSIGNMENT AND MANAGEMENT OF INSURANCE CLAIMS

(71) Applicant: GIGAWARP TECHNOLOGIES LLC, San Antonio, TX (US)

(72) Inventors: Larry B Cochran, San Antonio, TX (US); Anthony H Scow, San Antonio, TX (US); Michael T Cronin, San Antonio, TX (US)

(73) Assignee: GIGAWARP TECHNOLOGIES LLC, San Antonio, TX (US)

( * ) Notice: Subject to any disclaimer, the term of this patent is extended or adjusted under 35 U.S.C. 154(b) by 87 days.

(21) Appl. No.: 16/551,140

(22) Filed: Aug. 26, 2019

Related U.S. Application Data

(63) Continuation of application No. 15/430,437, filed on Feb. 10, 2017, now abandoned, which is a continuation-in-part of application No. 15/152,089, filed on May 11, 2016, now abandoned, which is a continuation-in-part of application No. 14/520,935, filed on Oct. 22, 2014, now abandoned.

(60) Provisional application No. 62/363,600, filed on Jul. 18, 2016, provisional application No. 62/033,322, filed on Aug. 5, 2014, provisional application No. 61/893,957, filed on Oct. 22, 2013.

(51) Int. Cl.
  *G06Q 40/08* (2012.01)
  *G06Q 10/00* (2012.01)

(52) U.S. Cl.
  CPC .............. *G06Q 40/08* (2013.01); *G06Q 10/20* (2013.01)

(58) Field of Classification Search
  USPC ....................................................... 705/4, 35
  See application file for complete search history.

(56) References Cited

U.S. PATENT DOCUMENTS

| | | |
|---|---|---|
| 7,127,716 B2 | 10/2006 | Jin et al. |
| 8,046,281 B1 | 10/2011 | Urrutia |
| 8,401,896 B2 | 3/2013 | Wargin et al. |

(Continued)

OTHER PUBLICATIONS

U.S. Appl. No. 14/520,935 Office Action dated Jan. 25, 2017.

(Continued)

*Primary Examiner* — William E Rankins
(74) *Attorney, Agent, or Firm* — Wilson Sonsini Goodrich & Rosati

(57) ABSTRACT

The present invention relates to methods and systems that automate the assignment of insurance claims to the best available resource utilizing the loss, location, and other criteria. Disclosed embodiments incorporate real-time dynamically updated geographic data into the claims assignment process. In accordance with the geographic data and other data related to particular claims, the resources, which include adjusters, can be assigned to claims in close proximity to their real-time location, and the dynamic nature of the geographic data means that claims are assigned to adjusters as received. An adjuster already in proximity to a location of incoming new claims can have claims added and removed based on real-time geographic data and as claims are filed. Some disclosed embodiments effect the assignment of automobile insurance repair claims to the best available resource, where the resource is a person or entity which operates to resolve automobile repairs.

17 Claims, 14 Drawing Sheets

(56) References Cited

U.S. PATENT DOCUMENTS

| | | | |
|---|---|---|---|
| 8,706,542 B2* | 4/2014 | O'Meara | G06Q 10/06 |
| | | | 705/7.16 |
| 10,373,256 B1* | 8/2019 | Allen | G06Q 10/10 |
| 10,832,347 B1 | 11/2020 | Westhues et al. | |
| 2002/0029161 A1 | 3/2002 | Brodersen et al. | |
| 2002/0035488 A1 | 3/2002 | Aquila et al. | |
| 2003/0078816 A1 | 4/2003 | Filep | |
| 2004/0148204 A1* | 7/2004 | Menendez | G06Q 40/08 |
| | | | 705/4 |
| 2004/0225535 A1 | 11/2004 | Bond et al. | |
| 2006/0059021 A1* | 3/2006 | Yulman | G06Q 40/08 |
| | | | 705/4 |
| 2007/0100669 A1 | 5/2007 | Wargin et al. | |
| 2010/0169147 A1* | 7/2010 | McCormack | G06Q 30/02 |
| | | | 705/7.12 |
| 2010/0174564 A1* | 7/2010 | Stender | G06Q 40/08 |
| | | | 705/4 |
| 2011/0071858 A1 | 3/2011 | Keefer | |
| 2011/0301985 A1 | 12/2011 | Camp et al. | |
| 2012/0143634 A1* | 6/2012 | Beyda | G06Q 10/06 |
| | | | 705/4 |
| 2013/0218931 A1* | 8/2013 | Lewis | G06F 16/21 |
| | | | 707/803 |
| 2013/0275169 A1 | 10/2013 | Acres | |
| 2015/0154713 A1* | 6/2015 | Diaz | G06Q 40/08 |
| | | | 705/4 |
| 2015/0278728 A1* | 10/2015 | Dinamani | G06Q 40/08 |
| | | | 705/4 |

OTHER PUBLICATIONS

U.S. Appl. No. 15/152,089 Office Action dated Dec. 28, 2016.
U.S. Appl. No. 15/430,437 Office Action dated Jan. 31, 2019.
U.S. Appl. No. 15/430,437 Office Action dated May 21, 2019.
Co-pending U.S. Appl. No. 14/520,935, inventors Cochran; Larry B. et al., filed Oct. 22, 2014.
Co-pending U.S. Appl. No. 15/152,089, inventors Cochran; Larry B. et al., filed May 11, 2016.
Co-pending U.S. Appl. No. 15/430,437, inventors Cochran; Larry B. et al., filed Feb. 10, 2017.
Co-pending U.S. Appl. No. 17/162,846, inventors Cochran; Larry B. et al., filed Jan. 29, 2021.

* cited by examiner

FIG. 8c
FIG. 8d
FIG. 8e

| Key Performance Indicator | Prior Art | Invention | Change/Benefit | % Change |
|---|---|---|---|---|
| Number of Claims | 1,039 | 1,039 | 0 | |
| Time to Assign (hrs) | 36 | 1 | (35) | 97% |
| Drive Distance (avg one-way) | 17 | 3 | (14) | 82% |
| Drive Distance Cumulative | 17,497 | 3,533 | (13,964) | 82% |
| Tip Time (days) | 6 | 5 | (1) | 17% |
| Tip Time (Cumulative Days) | 6,546 | 5,403 | (1,143) | 17% |

FIG. 9

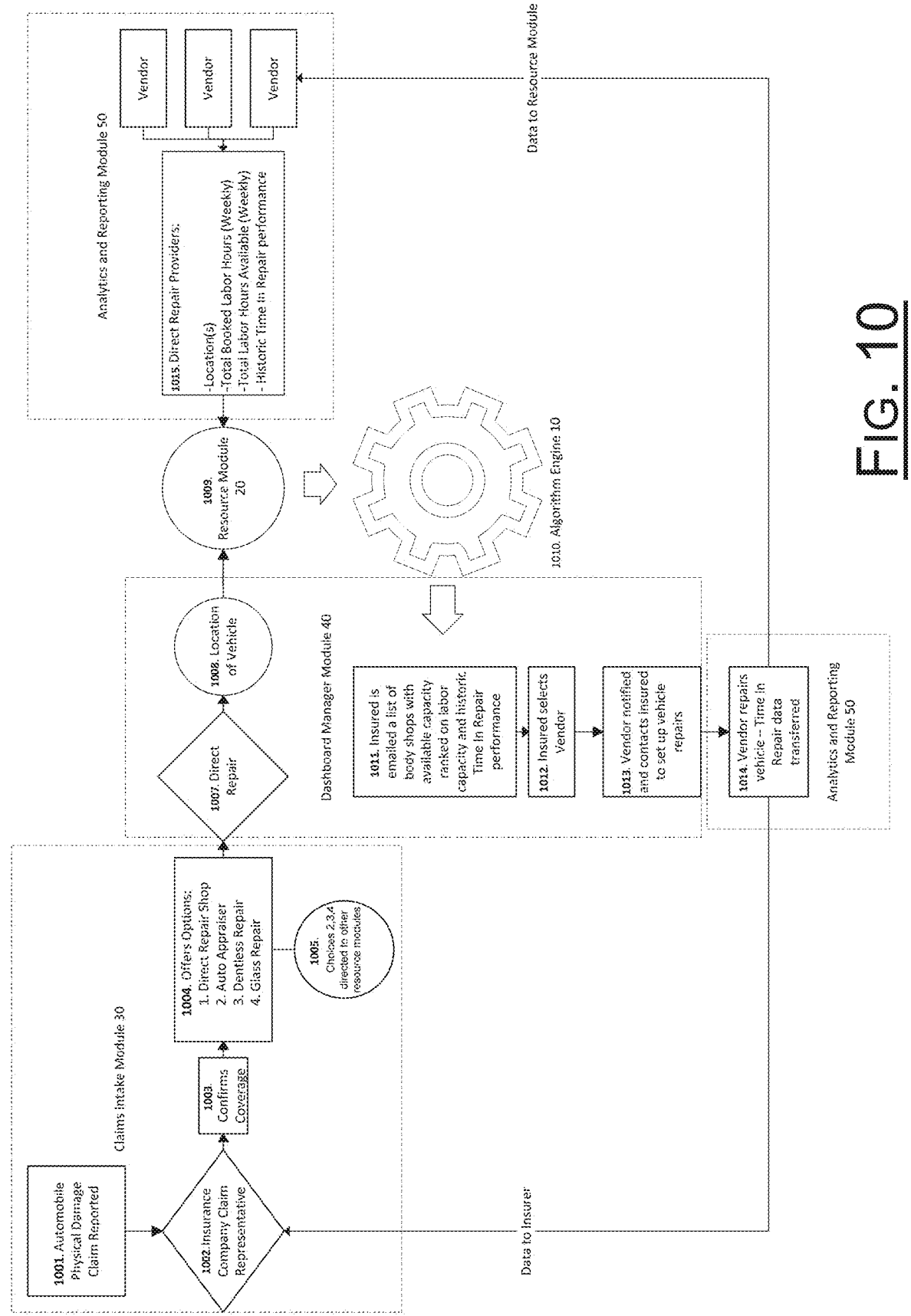

DYNAMIC LOCATION TRACKING ASSIGNMENT AND MANAGEMENT OF INSURANCE CLAIMS

CROSS-REFERENCE

This application claims the benefit of U.S. Provisional Application No. 62/363,600, filed Jul. 18, 2016, and is a continuation-in-part of U.S. application Ser. No. 15/152,089, filed on May 11, 2016, which is a continuation-in-part of U.S. application Ser. No. 14/520,935, filed on Oct. 22, 2014, with claims the benefit of U.S. Provisional Application No. 62/033,322, filed on Aug. 5, 2014, and 61/893,957 filed on Oct. 22, 2013, which applications are incorporated herein by reference in their entireties.

NON-PUBLICATION REQUEST

This application is submitted with an accompanying non-publication request in accordance with 35 CFR U.S.C. § 122(b). Accordingly, the subject matter of this application is to be maintained in secrecy until and unless Applicant allows a patent to issue based on this application.

BACKGROUND OF THE INVENTION

1. Field of the Invention

The present invention relates to methods and systems of providing technology solutions to manage Property and Casualty (P&C) insurance claim triage, evaluation, assignment and resolution. The field of the invention includes, but is not limited to, property and casualty claims, traditional insurance companies, governmental insurers, self-insured entities and risk pooling organizations, as well as independent adjusting firms and third party claim estimating software/network providers. A preferred embodiment applies an intelligent dynamical real-time telematics-based algorithm to locate and track insurance adjusters and assign insurance claims to them based on a variety of factors including adjuster experience, license status, physical location, and capacity availability. An alternative embodiment relates to providing a market for the direct repair of automobile insurance claims. However, it should be evident to one skilled in the art how the innovations of the present invention, as exemplified by the described embodiments can be applied to other insurance fields.

2. Description of Related Prior Art

The insurance claim adjustment market in the United States is a highly competitive and complex business environment typically involving large amounts of money being exchanged in multiple transactions. According to some estimates, over 75 million claims were processed in the US market in 2015. This amounts to over 290,000 claims handled per typical business day. Furthermore, P&C insurance carriers commonly rely on an internal, and often highly inefficient, patchwork of proprietary home-built, vendor-customized, or off-the-shelf software products to manage the claims administration value chain, employing a large number of internal claims management professionals together with over 135,000 external businesses engaged in Third Party Administration and Insurance Claims Adjusting. In the current art, the receiving, reviewing, evaluating, and assigning of these claims is conducted individually in a very labor-intensive process involving human interaction during each processing stage. A 30-second reduction in the claims initiation and/or review process could reduce the costs of administering claims by as much as 1,200 full time workers per year in the claims industry. Handling and coordinating the claims process is a difficult task just to accomplish, much less accomplish efficiently.

In the current state of the art, the insurance claims process starts with an event that causes a claim to be filed with an insurer. In many cases this can be an event that affects a single home such as damage caused by a fire or plumbing leaks. In some cases an area is hit by a storm or other catastrophic event that can cause multiple claims to be filed across the area. In other cases it is an automobile accident or an on-the-job injury resulting in a worker's compensation claim. These events can result in thousands of claims from multiple insurance companies that need to be reviewed by a claims adjuster.

Most insurance carriers and self-insured organizations ("claim managing firms" or "insurers") use sophisticated software and information systems to help manage their claims. No matter the system used, they require humans to make the decisions to whom each claim is assigned, from the inception of the claim until final settlement or disposition. In many instances, multiple personnel or external vendors will be involved with the claim cycle process.

Each claim assignment or routing decision, while routine in most cases, can be complicated owing to the dynamic nature of the human resources that are engaged to manage, investigate, or assist with the claim. People are mobile and constantly on the move. They have different skill sets and different licenses or credentials and experience for their specialization. People also have different thresholds of efficiency, whether it is how many claims they can handle in a day, or their operating levels of quality and speed of what they do, which presents decision challenges with respect to optimizing the workforce.

Managing this dynamic data across the tens of thousands of people that handle claims in the U.S. every day is a major challenge and consumes time which affects customer service. For example, batches of claims are received by claim managing firms and are reviewed by managers. A dedicated manager can take up to 8 minutes to assign a claim to a single adjuster. For a major event involving 70,000 claims, this exercise can stall thousands of parallel activities within the critical path of the claims from being resolved, from dispatch to settlement and completion of repairs. The manager's job is to assess and assign the claim to an adjuster. Ideally each claim is assigned in a manner to maximize the efficiency of the process. In practice, the time requirements result in inefficient assignment of claims.

Each individual claim is reviewed by managers and assigned to individual adjusters on an individual or small group basis (5-10 claims). This operation takes considerable management resources to review, map and match an adjuster with the correct skills, licenses, and certifications for the claim. One firm can receive thousands of claims in a single day. When large numbers of claims are received they are generally not analyzed and tend to be distributed sometimes by zip code, and most often they are just matched with adjusters with no logic or regard to efficiently matching the claim with the correct adjuster.

In the case of automobile damage claims, in the current state of the art, the choice of body shop to accomplish the repairs is done on an ad hoc basis. The insurance claim representative has a list of body shops and generally chooses the shop based on random factors. This results in many inefficacies. Some body shops may be overworked while others are under-utilized. Some body shops may be more economical while others overcharge. Some might have better outcomes with certain types of repairs. As it currently stands in the art, there is no method to effectively balance work, collect and evaluate costs and repair outcomes, and assign repairs in the most cost efficient manner.

Therefore, there is a long-felt need in the art for an automated system to reliably, objectively, consistently, and efficiently route, assign and manage insurance claims, including automobile repair insurance claims, and taking into account not only adjuster skills, but also real-time physical location as well.

SUMMARY OF THE INVENTION

The innovations of the present invention provide methods and systems to reliably, objectively, consistently, and efficiently assign and manage automobile insurance claims. One component of the disclosed system relates to a cloud-hosted, multi-tenant SaaS (software-as-a-service) application driven by a proprietary user interface and resource module that communicates with an algorithm engine to assess and decide what is the most efficient allocation of claims to the appropriate resources that would include insurance management, insurance claim adjusters, third party specialists such as automobile repair shops, contractors and other workers involved in the insurance claim cycle. For the vast majority of claim managing firms, each time a claim is received, it triggers a series of decisions that must be made and then processed to move the claim along a path from filing to inspection or investigation, to settlement or disposition.

Preferred embodiments have the disruptive potential to reduce overall P&C industry claims-related expenses and indemnity losses by over $74 billion per annum in the U.S., representing an over 21% cost savings for the industry as a whole while contributing 0.4% to the U.S. Gross Domestic Product. Such cost savings are enabled by the operation of the proposed embodiments to reduce claims handling cycle time, adjuster cost, vehicle driving cost, claims loss severity, claims-related fraud, and erroneous assignment litigation costs.

Preferred embodiments improve upon prior inventions by incorporating real-time dynamically updated geographic data into the claims assignment process. This results in many efficiencies as adjusters can be assigned claims close to them, minimizing travel time. Additionally, the dynamic nature of the geographic data means that claims are assigned to adjusters as they come in. Accordingly, an adjuster already in a neighborhood can have claims added and removed based on real-time geographic data and as claims are filed.

After taking first notice of loss ("FNOL"), insurers must examine the loss report, determine what type of skill or expertise is required, where the best person or resource that fits that need is located relative to the location of the loss, and then physically assign the claim to that person or resource to begin the process. Through this process cycle, a single claim can bounce from one resource to the next until it ultimately reaches the right resource, all the while eating up precious time, expense and the patience of the claimant or policyholder. Oftentimes, this results in an ad hoc allocation of repairs with no accounting for efficiencies or prior outcomes.

By using the present invention in place of human-based processes for assigning and routing claims, the Applicant has realized up to a 25% reduction in overall claim cycle time or 24 hours. Therefore, if the present invention can reduce the life cycle of claims by just 1 hour from the entire 69 million claims processed each year in the US, insurance companies could reduce labor-related claims processing costs by up to $2 billion per year. This is only if it reduces 1 hour from claim life cycle; in actual practice the present invention is likely to reduce it by much more.

In the prior art, the adjuster location was static. The present invention adds dynamic location-based information delivered by a Global Positioning System (GPS) or other location-aware devices to the claims assignment process. In this method, the adjuster can start the day in one neighborhood with a certain group of assigned claims. As other claims come in throughout the day, the claims assigned are adjusted based on the geographic location of the claims as well as the dynamically updated location of the adjuster.

In addition to reducing claim processing time, the disclosed systems and methods can reduce driving time and expenses significantly. A recent simulation of before-and-after use of preferred embodiments of the present invention in a storm event and related property claims, driving distance for field adjusters was reduced from over 17 miles to just over 3 miles which amounts to more than an 80% reduction in driving distance. This represents $5.30 cost savings per typical processed claim and has the potential to reduce overall P&C insurance vehicle-related costs by over $400 million per annum. More particularly, the speed and accuracy of the disclosed assignment algorithm enable lower costs with respect to fuel, tires, maintenance, vehicle depreciation, and vehicle insurance, as well as other related costs. In turn, many efficiency benefits over the prior art are provided through operation of the disclosed embodiments. Some disclosed embodiments can also reduce costs and repair times when assigning claims to a resource, such as for effectuating automobile repairs as an example. Such embodiments operate to keep track of booked labor hours compared to total available labor hours. In this way, automobile repairs can be assigned across the market of direct repair auto body shops so that each shop's resources are utilized efficiently.

Claims are received, the data parsed, adjusters are assigned, and body shop information is passed to the insured along with capacity, costs, and prior outcome information. All of this information is automatically gathered, collated, and processed by the invention, in part according to user-modified algorithms, and in some cases, according to the insured's policy coverage limits. The user can modify the algorithm to weigh different factors as more important than others, particularly when assigning adjusters. One of the main advantages of the invention is that the assignment to an adjuster or other resource proceeds in parallel and according to a set of objective criteria. Whereas in the prior art, adjusters were assigned individually and subjectively, by using the disclosed systems and methods, multiple adjusters and other claim-required resources can be assigned almost as soon as the claims are filed, limited only in the processing power of the systems of the present invention.

Further advantages include the improved, consistently applied logic to assigning claims to field adjusters and other claim resources to optimize cycle times. The present invention improves the efficiency of the assignment of these resources, therefore quality and customer satisfaction is improved. Another advantage in some embodiments is that the assignment to an automobile repair shop is made by the insured based on more accurate information. The present invention is also more accurate by using repetitive logic rather than fallible human processing. The present invention allows management resources to be shifted to more value-added activities. The present invention provides significant improvement in deployment logistics. Further, all stakeholders in the insurance claim cycle benefit from compressed scheduling and logistical accuracy. The present invention provides the ability to manage several multiple and varied claim events simultaneously 24 hours a day, 365 days a year.

The speed and accuracy of the Claim-to-Adjuster Matching feature of the disclosed embodiments impact every critical cost component of the P&C industry claims-handling process, including, but not limited to, 1) number and cost of claims adjusting personnel; 2) adjuster vehicle and driving costs; 3) reassignment work; 4) misassignment litigation; 5) claims processing cycle time; and 6) indemnity loss severity.

One principal feature of the disclosed system includes integration with value-added database searches at the origination of the claim cycle. For example, preferred embodiments allow a user to search commercially available databases as well as data stores maintained by the user. Such search capabilities help avoid fraud and conflicts with other claim assignments. Preferred embodiments allow claims with matches to be directed to specific claim units or personnel for additional review.

Another unique and otherwise unavailable feature of a preferred embodiment is the "Pause/Aggregation" component. This feature allows the user to pause and aggregate groups of claims associated with a specific peril, date of loss, event code, state, county, or zip code. The pause can be implemented without affecting the normal claims automated intelligent assignment process. This cluster pause will notify the insured that the claim has been received and will be assigned to the best possible match within a specific period of time. By aggregating the claims, the ultimate assignment of all the claims results in the most accurate location and skills match to the claims, eliminating the need for separate simultaneous "route assignment" functionality. Moreover aggregation further increases the productivity of the resource while reducing drive time and vehicle expense. As time is saved by the resource, customer service and goodwill of the insured is increased. When the match is made (within the previously dictated time limit), the insured is notified of the resource match with contact information of the resource and an explanation of the claim cycle. This feature can be used for multiple specific perils, dates of loss, event codes, states, counties, or zip codes.

Historical client specific data related to claims distribution is aggregated, as well as anonymous industry data, allowing for predictive analytics and machine learning to further automate the creation of resource teams based on previous events. This data is also utilized in predicting staffing of resources and vendors based on past claims experience.

A preferred embodiment provides for user installation and simplified user customization. The user chooses from a broad claim type environment and further only viewing the data components that apply to that claim cycle. The list of data components will be dynamic and the same for all users.

Database or claim system interfacing of preferred embodiments is also standardized, eliminating the need for complicated Information Technology (IT) implementation. In addition to the standardized interfacing, preferred embodiments can also be customized to non-standard systems and databases remotely or on site.

Preferred embodiments of the disclosed system enable intelligent assignment prioritization. For example, an algorithm can prioritize the use of staff field resources before considering available inside staff and or an inside staff with a vendor assignment option. This optimizes utilization of claims handling resources throughout the supply chain.

Many other objects, features, advantages, benefits, improvements and nonobvious unique aspects of the present invention, as well as the prior problems, obstacles, limitations and challenges that are addressed by the present invention, will be evident to the those who are skilled in the art, particularly when this application is considered in light of the prior art. It is intended that such objects, features, advantages, benefits, improvements and non-obvious unique aspects are within the scope of the present invention, the scope of which is limited only by the claims of this and any related patent applications and any amendments thereto.

To accomplish all the above, it should be recognized that the present invention may be embodied in the form illustrated in the accompanying drawings, attention being called to the fact, however, that the drawings are illustrative only, and that changes may be made in the specifics illustrated or described.

BRIEF DESCRIPTION OF THE DRAWINGS

FIG. 1 is a flow chart of the current art for assigning insurance claims to

FIGS. 5a-c are examples of the user interface of the Resource Module of the present invention.

FIGS. 8a-e are an examples of the user interface of the Analytics and Reporting Module of the present invention.

FIG. 9 is a table detailing some of the time and driving advantages realized by the present invention.

FIG. 10 is a flow chart that represents the invention's functionality with regard to managing physical damage in automobile claims, specifically the direct repair shops utilized for repairing automobiles after a covered accident.

DETAILED DESCRIPTION OF PREFERRED EMBODIMENT

Figure 1:
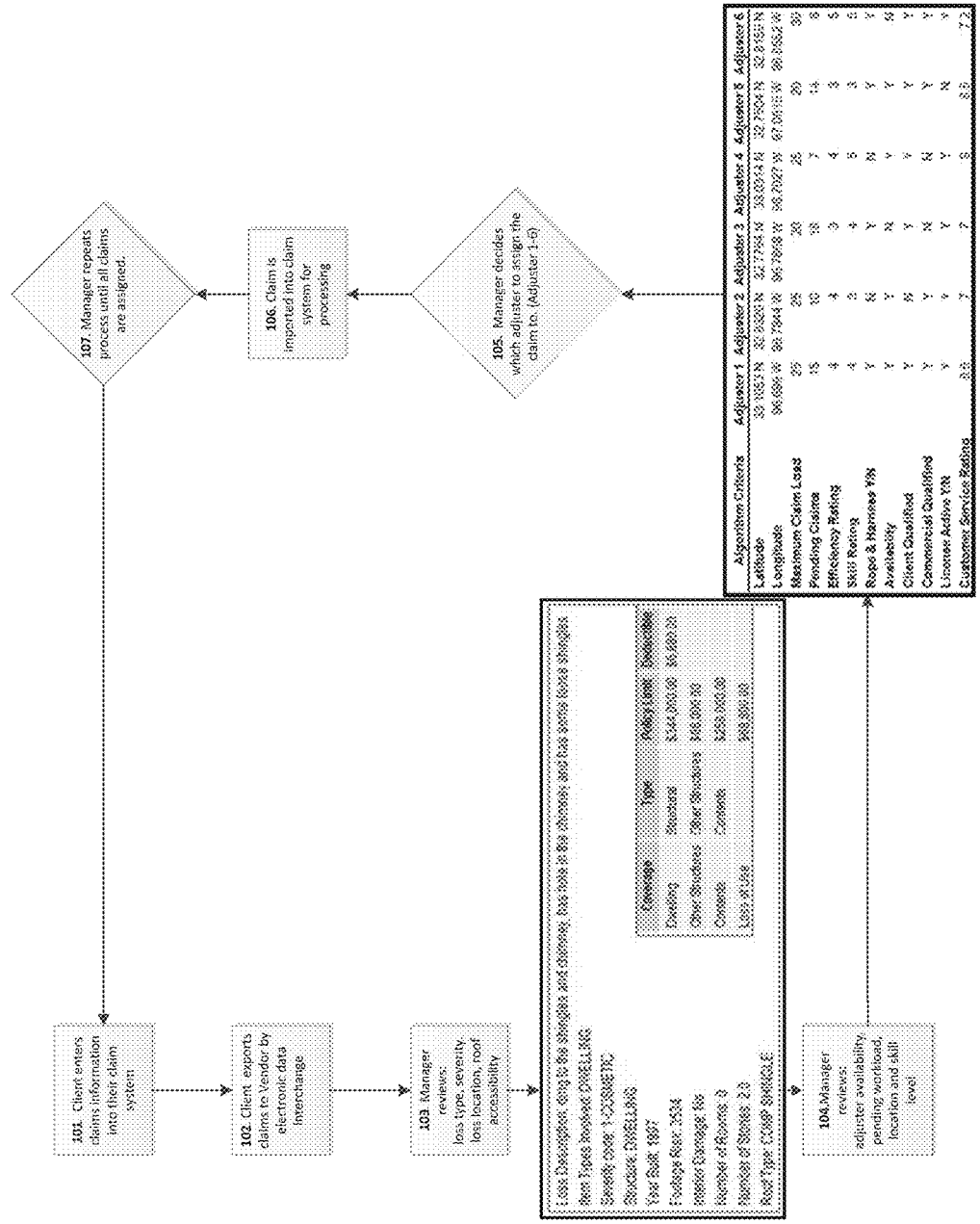

The following is a description of the methods and systems to reliably, objectively, consistently, and efficiently assign and manage insurance claims. At the outset, any use of the term "resource" may refer to persons or entities, including insurance claim adjusters, vendors, staff members, and repair providers. FIG. 1 depicts the current state of the art. An event occurs that causes a claim to be filed with an insurer. The claims process starts with step 101; the insured or a claims representative (the "client") enters the claims information into the claims system. In step 102, the client exports the data to a vendor's electronic data exchange. In steps 103 and 104, a manager reviews the claims data and the adjuster data. In step 105, the manager assigns the claim. In step 106, the claim is imported into the claims system for processing, and finally in step 107, the process repeats until all the claims have been assigned. The charts on FIG. 1 show the types of objective and subjective factors regarding the claims and the adjuster that a typical manager must review and weigh when assigning claims to an adjuster.

The typical time each round of this process takes can be up to 18 minutes per claim. Claims are received by insurance carriers or independent adjusting and third party administration firms and are reviewed by managers or other employees to determine where to route the claim to begin the process of resolution. A dedicated manager can take up to 8 minutes to assign a claim to a single adjuster or other resource. This exercise can stall thousands of potentially parallel activities within the critical path for the claims to be resolved from dispatch to settlement and then completion of repairs. The manager's job is to assess the claim and assign the claim to an adjuster or other resource. Ideally, each claim is assigned in a manner to maximize the efficiency of the process.

In practice, the time requirements result in inefficient assignment of claims. For instance, in the current state of the art, claims are routed to resources that are stationed in a general geographic location. Once a resource has received a claim, the resource will utilize route optimization or scheduling services or software to maximize their efficiency for driving to and from each claim. Without the use of dynamic tracking of each resource, its location, availability and specific skills before assigning the claim, many claims wind up assigned or routed to the same resources repeatedly and are poorly coordinated or clustered, which results in a variety of inefficiencies. Longer travel distances per claim, assignments made to inadequately qualified resources and assignments made to unavailable resources are some key areas of field assignments that drive up the claim cycle time and the cost per claim, while negatively impacting customer service.

Although as represented in FIG. 1, the prior art process may involve computer implemented processes in the overall claim cycle, the present invention operates to improve upon the automated aspects of prior art claim assignment processes by relying on four key interface modules and an algorithm engine that interfaces with each of those modules. The improvements to the prior art are realized by the disclosed embodiments being enabled to make objective decisions far more quickly and accurately than human processors can, as well as to incorporate efficiency objectives into the decision-making process.

Figure 2:
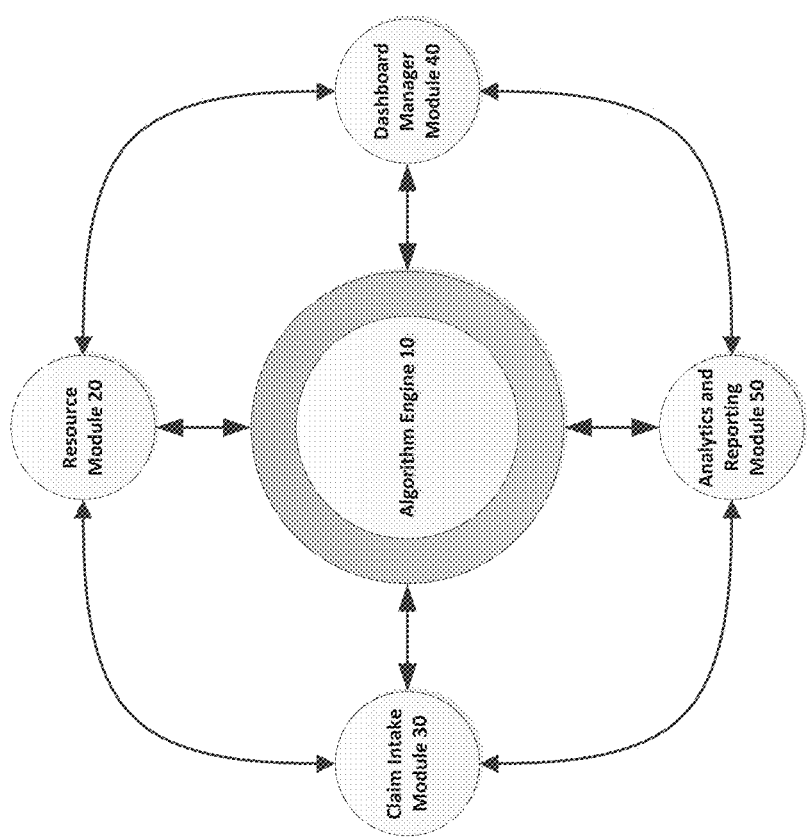
FIG. 2 is a schematic overview of the major components of the present

As illustrated in FIG. 2, at the center of the invention is the Algorithm Engine 10. The Algorithm Engine 10 interfaces with all of the modules to match and route claims to optimal resources or multiple resources. It gathers the data and performs a logical analysis to efficiently allocate the claims and workers. The Algorithm Engine 10 evaluates data received from the Resource Module 20 and the Claim Intake Module 30. It then applies rules established in the Dashboard Manager Module 40 to determine logic for routing claims. The evaluation can include such items as claim type, location of the claim, qualifications and requirement of the claim. The Algorithm Engine 10 then makes a determination of the best resource fit based on the rules established by the insurance company. The resource evaluation can include factors such as location and time to get to the claim, qualifications needed for the claim, workload and capacity. In preferred embodiments, various notifications, emails, and reports are automatically generated and sent by Analytics and Reporting Module 50, as well as being available on demand.

The Resource Module 20 manages the information for the adjusters and workers. It allows a user to setup employees, workers, or adjusters. It stores information regarding the state licenses, availability, military experience, or other relevant qualifications and information. In some embodiments, the Resource Module 20 gathers this information automatically by connecting with relevant databases and other sources. In some embodiments, this information is input by users. Using the information for adjusters and workers received and maintained by the Resource Module 20, the Algorithm Engine 10 tracks inception and expiration of certifications and licenses such that, when a certification or license of a particular adjuster or worker lapses, Algorithm Engine 10 removes the particular adjuster or worker from consideration when assigning claims for which the lapsed certification or license is necessary.

Each state establishes its own requirements related to licensure and certification. Any process or system for managing and assigning claims must consider the differences in requirements in each state in which claims may be made and assigned. Algorithm Engine 10 takes these differences in requirements into account in order to assign claims in the most efficient manner possible. For example, one State may require an adjuster's license to be active in order to assign a claim, but the State may also allow another worker to utilize an appointed license by the company in handling a particular claim. Other states may not allow claim assignments in accordance with such a process. Algorithm Engine 10 distinguishes between the different license and certification regimes and assigns claims accordingly.

Figure 3:
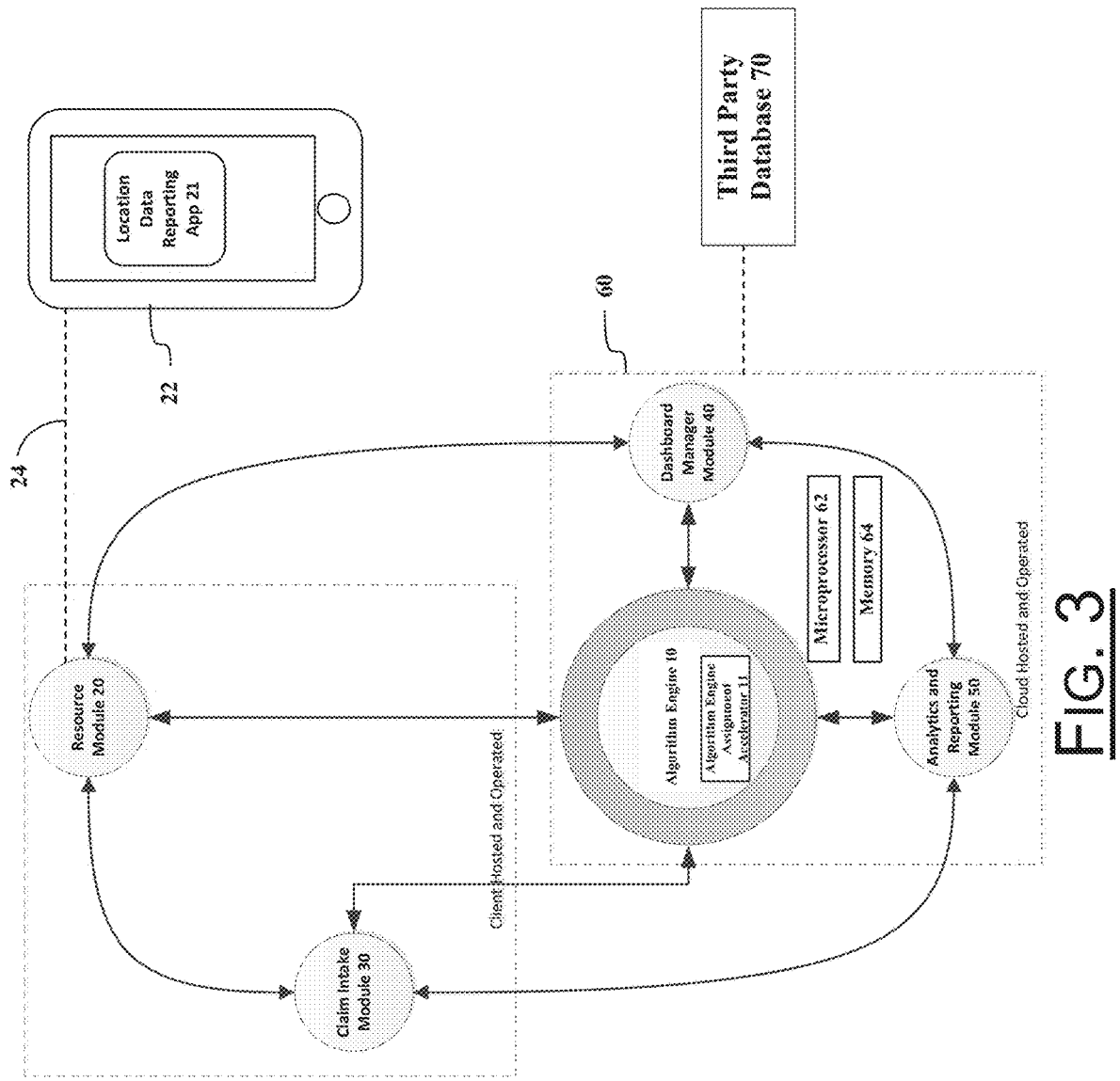
FIG. 3 is schematic overview of the division of hosting and operating the components of the present invention.

Referring to FIG. 3, in one embodiment of the invention the Resource Module 20 receives location data dynamically in real time from a Mobile Device 22 used by the resource from the Location Data Reporting Application 21. Mobile Device 22 can be any device having access to mobile data service such as a smartphone, tablet, and the like. For example, the adjuster installs the Location Data Reporting Application 21 on his Mobile Device 22 and activates it at the beginning of his work day. When activated, Location Data Reporting Application 21 dynamically updates the Resource Module 20 with real-time location data using GPS or other location-determining applications. This real-time location data is sent by Mobile Device 22 via Secure Network Connection 24, and the real-time location data is then received by the Resource Module 20. This dynamic real-time location data is then sent by Resource Module 20 to Algorithm Engine 10, and Algorithm Engine 10 receives and uses the real-time location data, along with other received data, to assign claims to an adjuster. In some embodiments the claims assignments are updated in real time throughout the working day.

The Claim Intake Module 30 automatically receives the FNOL or claim information that sets the conditions for the assignment to a qualified resource. The Dashboard Manager Module 40 allows a user to set up and modify the factors that auto assign the claims and the resource (which includes workers). With respect to selecting an appropriate resource for assignment of a claim, and based on the particular factors established by a user through interaction with Dashboard Manager Module 40, Algorithm Engine 10 selects a resource from a database of resources, based at least in part on the resource's qualifications, certifications, availability, real-time location, and skills assessment. The Dashboard Manager Module 40 also allows a user to view output which includes information regarding the resource to which the claim has been assigned. In some embodiments, the Dashboard Manager Module 40 allows a user to run "what if" scenarios and presents various reports of efficiency factors. For example, it will produce a report of the estimated number of miles driven given the current factors for auto assignment. The Analytics and Reporting Module 50 sends automated communications when assignments are made.

This module also allows a user to evaluate claim statistics such as the number of claims automatically assigned, the number of claims manually assigned, and other relevant statistics.

FIG. 3 shows one embodiment of the current invention. In this embodiment, the Claim Intake Module 30 and the Resource Module 20 are hosted and operated by the claim managing firms, except for the location updating software that resides on the adjuster's mobile device. The Algorithm Engine 10, Dashboard Manager Module 40, and the Analytics and Reporting Module 50, are hosted on Claim Server 60 and operated by the invention provider. In this embodiment, the claim managing firms interact with these portions of the invention via a web interface. Data is exchanged between the client managing firm hosted modules and the invention provider hosted modules via secure internet communication. This allows a client to keep its confidential data to maintain compliance with laws and regulations.

A Microprocessor 62 and a Memory 64 are associated with Claim Server 60. Microprocessor 62 executes a set of instructions or rules in accordance with established user requirements which are stored in Memory 64 based on claims information received by Claim Server 60 for assigning claims to a resource in accordance with the methods herein described.

Through execution by Microprocessor 62, Claim Server 60 is enabled to communicate and search one or more Third-Party Databases 70, as well as previous claim data maintained by a user, for valuable information which further improves the claims assignment process. For example, preferred embodiments are enabled to allow a user to search commercial databases such as the Fraud Bureau, ISO ClaimSearch®, as well as previous claim experience data housed by the user. This search feature enhances the claims evaluation process by allowing a user to identify and avoid potential fraud, as well as conflicts with other insurers and claims within the user's system.

Figure 4:
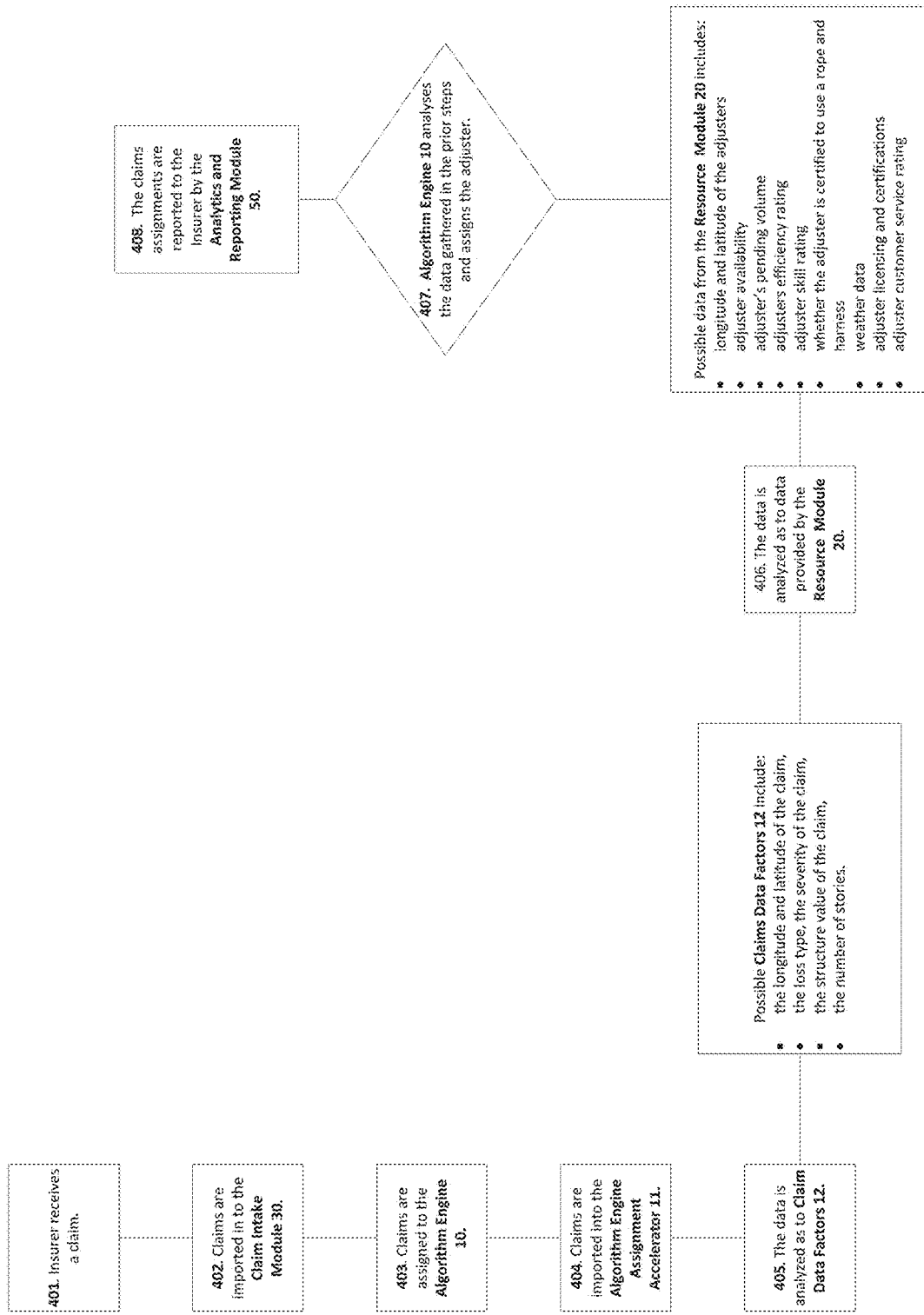
FIG. 4 is a flow chart of the methods and systems of the invention for assigning insurance claims to claims adjusters.

FIG. 4 represents the operation of a preferred embodiment of the present invention as it interfaces with the prior art from the initial claim filing to the assignment of an adjuster. In step 401 of the process, the claim is received by an insurer. In step 402, the claim is imported and analyzed by the Claim Intake Module 30. The Claim Intake Module 30 provides the initial parsing of information from the insurer. It acts as the interface between the insurer and the adjuster assignment company.

In step 403, the Claim Intake Module 30 assigns the claims to the Algorithm Engine 10. In step 404, the Algorithm Engine 10 imports all claim data received from Claim Intake Module 30 into the Algorithm Engine Assignment Accelerator 11. In step 405, the Algorithm Engine 10, through Algorithm Engine Assignment Accelerator 11, analyzes the Claim Data Factors 12. In the preferred embodiment, this data is parsed into constituent elements which include the longitude and latitude of the claim (including the state, county, and zip code), the loss type, the severity of the claim to include items such as coverage amounts or the type of loss (such as "total loss"), the Property Claims Services (PCS) Code ("Catastrophe Code"), the structure value of the claim, and the number of stories/floors of a building affected. In alternative embodiments, the Claim Data Factors 12 may also include other information and data. The list provided here is provided by example and not restrictive regarding the data contained in the Claim Data Factors 12.

In step 406, and once the Claim Data Factors 12 are determined, the Algorithm Engine 10 analyzes the data provided by the Resource Module 20. More particularly, Algorithm Engine 10 identifies the data necessary for efficiently assigning a particular claim to an appropriate resource. In a general sense, Algorithm Engine 10 analyzes the Claim Data Factors 12 related to a particular claim to identify what types of resources are required (e.g., internal staff, field staff, vendor, etc.), what licenses are required based on the state in which the loss occurred, and what certifications are required based on the loss type.

This data analyzed by Algorithm Engine 10 also includes the real-time longitude and latitude location of the resource using real-time GPS location data provided by the Location Data Reporting Application 21, in addition to particular data relating to the resource availability, the resource's pending volume, the resource's efficiency rating, the resource's skill rating, whether the resource is certified to use a rope and harness, weather data, the resource's licensing and certifications, and the resource's customer service rating. In alternative embodiments, the data provided by the Resource Module 20 may include alternative resource-relevant information and data.

In step 407, the Algorithm Engine 10 analyzes the data gathered in the prior steps and assigns the appropriate resource. In step 408, the claim is sent to the insurer by the Analytics and Reporting Module 50 for processing. The Algorithm Engine 10 can be adjusted to weigh different factors, depending on the user's priorities, via the Dashboard Manager Module 40. In the preferred embodiment, the Algorithm Engine 10 assigns the closest resource with the minimum certifications and skills appropriate for the claim. In alternative embodiments, the Algorithm Engine 10 can be tuned to weigh other factors. Some examples would be assigning resources with the best customer rating to the highest value claims, assigning and providing resources with an optimized route of claims, and/or assigning resources based on the claim severity and priority. These assignment factors are available for a user to implement based on the user's preference, and any other factors chosen by a user will be stored in the set of instructions in Memory 64 to be executed by Microprocessor 62 for assignment of particular claims. In some embodiments, the Algorithm Engine 10 will predict the length of the deployment and number of required resources to deploy, revenue generation, indemnity and expense for clients, and other forecasting. Further, the Algorithm Engine 10 will automatically provide suggestions to management such as when to add or remove resources from the field (per catastrophic event).

In preferred embodiments, Algorithm Engine 10 will handle each assignment in a balanced manner based on one or more assignment pathways, depending on the resource type. For example, Algorithm Engine 10 may employ a "Round-Robin" approach. This assignment approach occurs when more than one resource meets the requirements (location, licensure, certification, etc.) for receiving a claim assignment. If resource 1 last received a claim assignment at 10:30 A.M., and resource 2 last received a claim assignment at 10:31 A.M., then resource 1 would receive the next claim assignment in accordance with this assignment pathway, all other factors being equal.

Another assignment pathway is a load balance by assignment count for staff members of the user. For example, if a group of claims for assignment are received by Algorithm Engine 10, then Algorithm Engine 10 will evenly distribute the claims to those available resources, as determined by Algorithm Engine 10, who best match those requirements as defined in the set of instructions chosen by the user.

Still another claim assignment approach is a load balance by state or county for vendors. In accordance with this approach, claims received by Algorithm Engine 10 are evenly distributed for assignment to vendors based on an assignment percentage by state, or for a given county within a single state, respectively.

Once the Claim Data Factors 12 are analyzed, Algorithm Engine 10 can then determine from the location information if multiple claims arise from a specific peril, if the multiple claims occur on the same date or have the same event code, or if multiple claims are associated with one state, county, or zip code. Algorithm Engine 10 is adapted to pause the assignment process in such related claims. Algorithm Engine 10 is further adapted to aggregate such related claims which further increases efficiency by essentially performing a "batch" assignment of the multiple claims in accordance with the process herein described rather than assigning each individual claim upon receipt. When multiple claims arise from a common specific peril and/or arise at the same location are aggregated for assignment, the efficiencies of the disclosed system previously detailed are further realized. These efficiencies include reduced drive time, reduced vehicle expense, and increasing productivity.

Figure 5A:
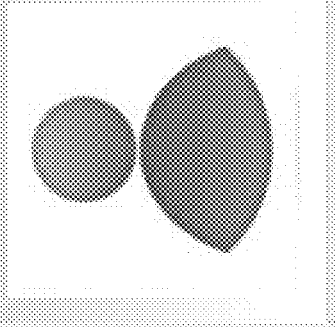
Figures 5B, 5C:
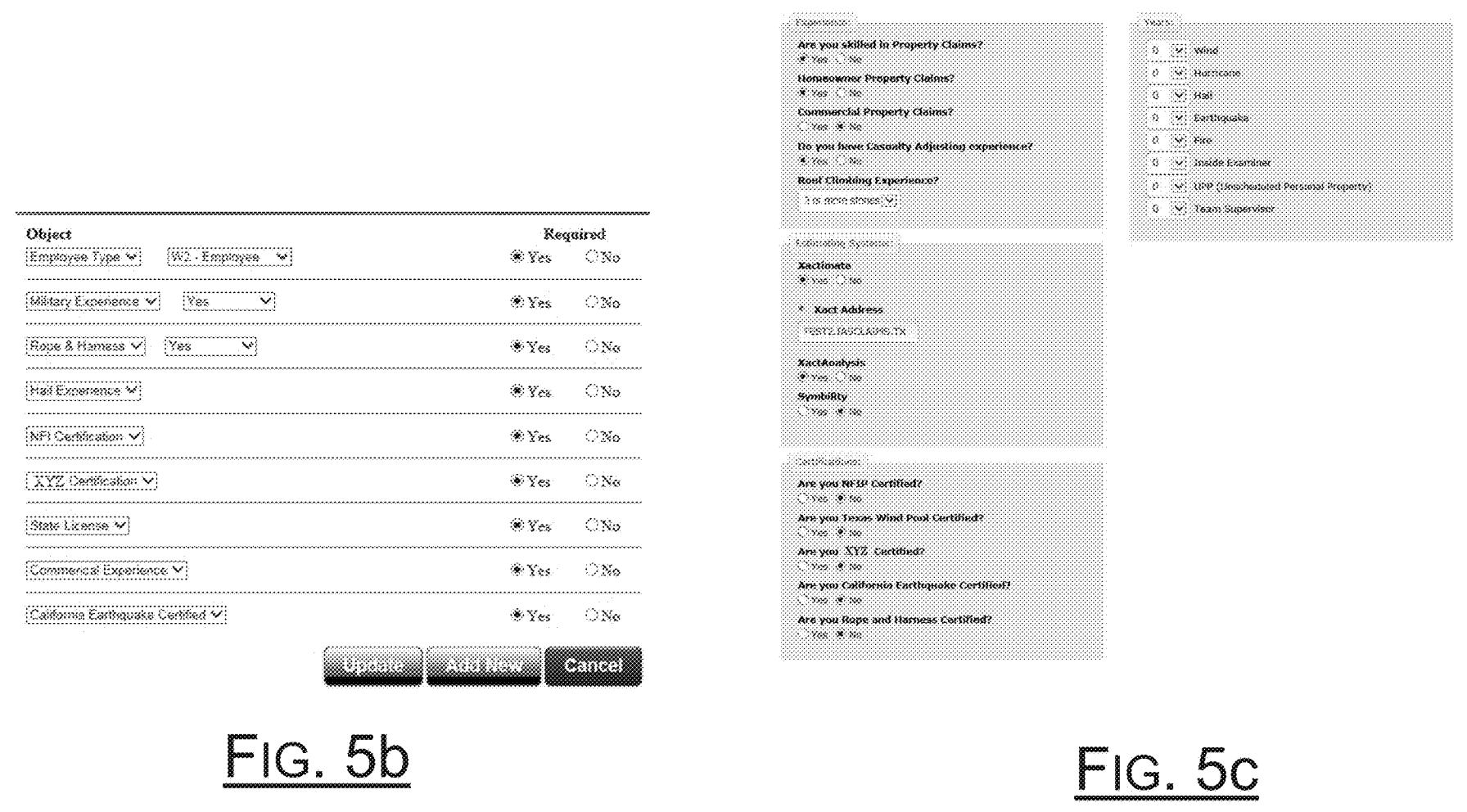

FIGS. 5*a*-*c* depict examples from the user interface of the Resource Module 20. In this embodiment, FIGS. 5*a*-*c* depict various options allowing a user to specify what qualifications, certifications, experience and other factors the adjuster has. In some embodiments this can include a space for a photograph of the resource that could be emailed to the customer with the claim.

Figure 6:
FIG. 6 is an example of the user interface of the Claim Intake Module of the present invention.

FIG. 6 is an example of user interface of the Claim Intake Module 30. In this embodiment, information about the claim such as the location and the type of insurance is provided.

Figure 7A:
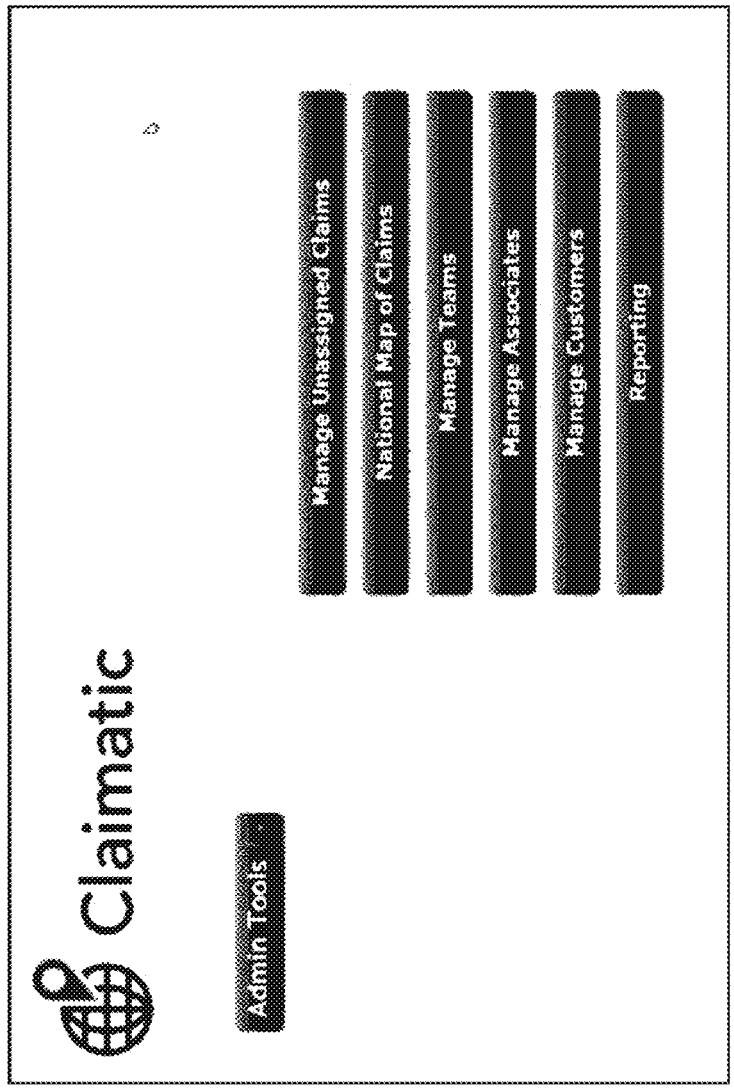
FIGS. 7a-c are an examples of the user interface of the Dashboard Manager Module of the present invention.
Figure 7B:
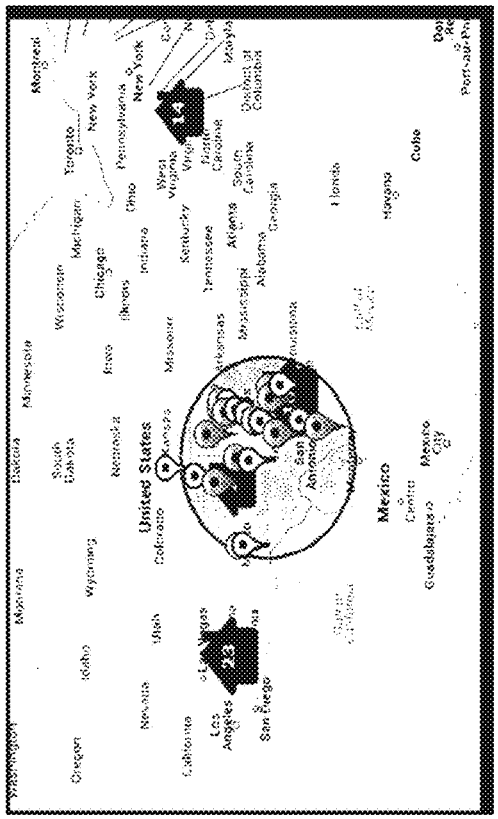
Figure 7C:
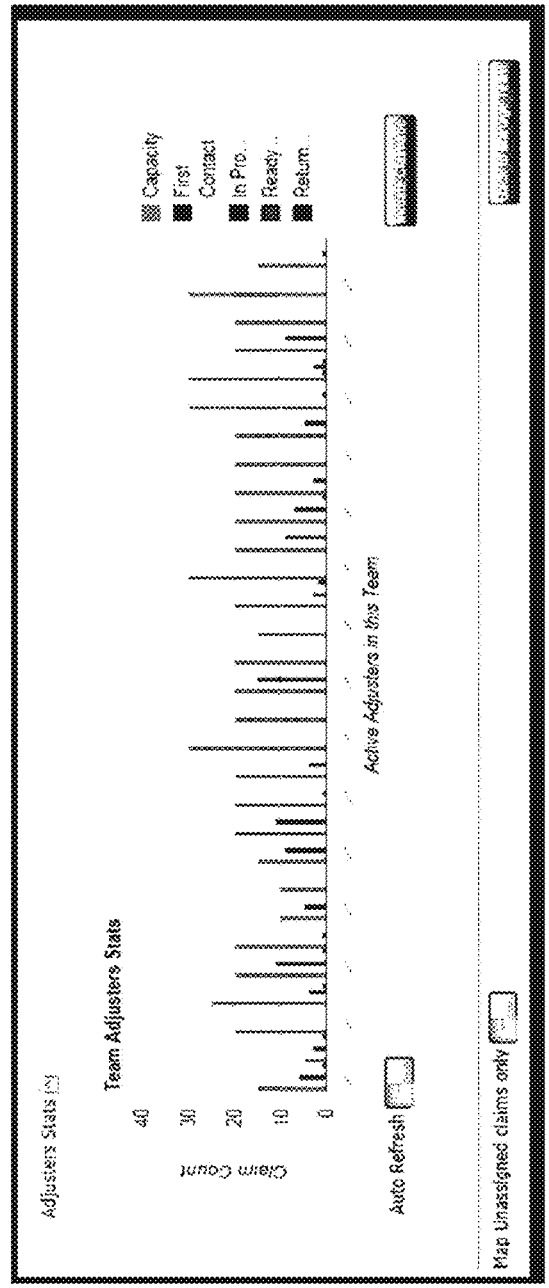
Figure 8A:
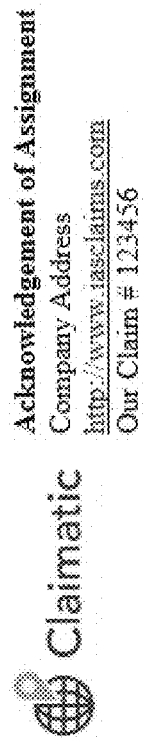
Figure 8B:

FIGS. 7*a*-*c* depicts examples of a user interface of the Dashboard Manager Module 40. In this embodiment, maps of claims are shown. It allows a user to manage teams, associates, and customers. It also provides access to reports such as statistics related to particular adjusters.

FIGS. 8*a*-*e* depict examples of the user interface of the Analytics and Reporting Module 50. In preferred embodiments, various notifications, emails, and reports are automatically generated and sent, as well as available on demand. These can include notification of assignment of claims, adjuster load reports, notification of adjuster activation, notification to the insured of the details of the claim assignment, and the like.

The table in FIG. 9 presents some of the real world benefits realized by the disclosed systems and methods. This table is based on trials conducted by the inventor. In the table, 1039 claims were processed under the prior art system and method, and the same 1039 claims were processed using the disclosed system and method. The disclosed system and method completed the assignment of the claims in 1 hour versus 36 hours under the prior art system and method, a reduction of over 97%. The disclosed system and method only required 2.8% of the time to assign the claims spent under the prior art. The average driving distance was also reduced 82%, from 17 miles to 3 miles. The cumulative driving distance also was reduced by 82%, from 17,497 miles to 3,533 miles. Furthermore, the tip time, both days and cumulative days, was reduced by 17%. It is clear that the disclosed systems and methods present advantages over the prior art as shown by these results.

FIG. 10 represents the operation of an alternate embodiment of the present invention as it interfaces with the prior art from the initial claim filing to the assignment of an automobile repair claim. As an overview, one embodiment of the disclosed system collects information from the First Notice of Loss (FNOL) and matches the location of the damaged automobile to one or more direct repair auto body vendors. The vendors provide data to the resource module such as the location of their shop(s), the total labor hours booked for the week and the total labor hours available to new repairs. The vendors are rated based on the accuracy of the labor availability reported in relation to their Time in Repair (TIR) results, which is the time from initial appointment with the insured until the automobile is released to the customer. Another of the benefits this embodiment of the disclosed system is a reduction in rental car expenses to the insurer, as well as increased policyholder satisfaction and subsequent improvement in customer retention and reduced policyholder acquisition costs.

In step 1001 of the process, the automobile physical damage claim is received by an insurer. In step 1002, the claim is received by an insurance company representative who confirms coverage (step 1003). In some embodiments, steps 1002 and 1003 are automated. In step 1004, various claim resolution options are presented, including 1) the automobile being sent to a direct repair shop; 2) an automobile appraiser sent to evaluate the vehicle; 3) on-site dent repair performed; and 4) glass repair performed. In step 1005, the preferred option is selected and is routed to the appropriate resource modules. In the present embodiment, the option for direct repair is selected and the process proceeds.

In this embodiment, steps 1001-1005 are imported and analyzed by the Claim Intake Module 30. The Claim Intake Module 30 provides the initial parsing of information from the insurer. It acts as the interface between the insurer and the adjuster assignment company.

In step 1007, the direct repair resource module is activated and information about the location of the vehicle location (step 1008) along with the other claim information is forwarded to the Resource Module 20 (step 1009). In step 1010, the Algorithm Engine 10 analyzes the data provided by the Resource Module 20. In some embodiments, this data includes the longitude and latitude of the resource, the resource availability, the resource's pending volume, the resource's efficiency rating, the resource's skill rating, which repairs the resource's certified to perform, the resource's licensing and certifications, the resource's prior history and the resource's customer service rating. In alternative embodiments, the data provided by the Resource Module 20 may include alternative resource relevant information and data.

In step 1011, the insured is sent an email communication including a list of body shops with available capacity ranked based on labor capacity and historic TIR performance by the Algorithm Engine 10. In step 1012, the insured selects a vendor or resource. In step 1013, the vendor or resource is notified and given the relevant information to contact the insured to schedule the vehicle repairs. In step 1014, the vendor or resource completes the repair, and TIR data is transferred to the Analytics and Reporting Module 50 and back to the insurer.

In step 1015, the data is collated and analyzed by the Analytics and Reporting Module 50 and is fed into the Resource Module 20 for the next round of claims. The direct repair providers are also able to update various information about their shops, such as total labor time available, in this step. Analytics and Reporting Module 50 analyzes the data gathered in the prior steps and assigns the appropriate resource.

The Algorithm Engine 10 can be adjusted to weigh different factors depending on the user's priorities via the Dashboard Manager Module 40. In a preferred embodiment, the Algorithm Engine 10 assigns the closest resource with the minimum certifications and skills appropriate for the claim. In alternative embodiments, the Algorithm Engine 10 can be tuned to weigh other factors. Some examples would be assigning resources with the best customer rating to the highest value claims, assigning and providing resources with an optimized amount of claims, and assigning resources based on the claim severity and priority.

The main advantage of the above-described embodiments is realized because the assignment of the resource proceeds in parallel and according to a set of objective criteria. Whereas in the prior art, resources were assigned individually and subjectively, by using the present invention, multiple resources can be assigned almost as soon as the claims arrive, limited only in the processing power of the systems of the present invention. Further advantages include the improved consistently applied logic to assigning claims to field resources to optimize cycle times. The present invention improves resource efficiency, therefore, resource quality and customer satisfaction. The present invention is more accurate by using repetitive logic rather than human processing. The present invention allows management resources to be shifted to more value-added activities. The present invention provides significant improvement in deployment logistics. Further, all stakeholders in the claim cycle benefit from compressed scheduling and logistical accuracy. The present invention provides the ability to manage several catastrophic events simultaneously The present invention features an interface that allows the resource management to monitor claim volume, assign claims that are not assigned by the automated system, add and subtract resources to the area, manage the time, and audit the claims. The adjusters or "resources" can use an interface to receive their claims, map out routes, update their license information, update their availability status, and update the claim information. The algorithm has a user interface that can be programmed by event by adding and subtracting items and using a toggle slider to adjust the importance of the criteria in the calculation. Managers can adjust priority on the fly, by storm or by weather event, eliminating the need for additional programming or IT involvement In some embodiments of the present invention, when the claim is assigned to the resource, an email is automatically sent to the insured with a photo of the resource and their contact information. When the claim is assigned to the resource, an email is automatically sent to the resource with the policy information. In some embodiments of the invention, the systems allow a resource to include pricing information, creating a market of adjusters based on price as well as other factors. In these embodiments, the Algorithm Engine 10 could be set to favor resources who will accept lower prices. In these cases, when multiple adjuster resources with similar skills and locations are available to handle a single loss, the available resources will be evaluated on the cost of engagement. Resources set their availability and will be able to adjust their commission percentage above or below the traditional fixed commissions. This feature would increase competition and change the claims resource marketplace. Availability and commission adjustments can be made on the fly.

Other embodiment portions of the invention will include a mobile application. The mobile application allows geolocation tracking and the availability information to further accelerate the optimal assignment of claims in real time. Another embodiment will allow for advanced predictive analytics of storms, catastrophe, and other claim-generating events. This would allow for the automated placement of resources to concentrate geographically where claims are to be predicted based on policies in force information overlaid with simulated event information.

The preferred embodiment is a front-end build using HTML 5 with CSS 3 utilizing JQuery and Ajax. Also used is Symphony high performance PHP framework. Cloud functions are replicated in real time across three different US cities with redundant power. All data is transmitted utilizing SSL 2048 bit encryption. Other embodiments of the invention could be implemented with other similar or related computer technologies and would be understood to be within the spirit and scope of the present disclosure.

The systems and methods of the invention require fewer claim managers and require lower experience levels of claim managers, thereby lowering labor costs. Resources are rewarded with additional work based on how they can compete with other resources in their geographic area or assigned geographic area. Claims are assigned only to licensed and approved resources possessing the skills, certifications, licenses and tools necessary to handle a specific claim.

In some embodiments of the present invention, the methods and systems described are provided via computer software, either via the internet, via a stand-alone software application operating independently or in connection with other software systems, or some combination of the two. As well, embodiments may come in any known form and may also be implemented by hardware, software, scripting languages, firmware, middleware, microcode, hardware description languages, and/or any combination thereof.

With reference again to the figures, it should be understood that the graphical representation of the system is an exemplary reference to any number of systems that may be implemented by the present invention whether through the web or as standalone executable.

Specific details are given in the above description to provide a thorough understanding of various preferred embodiments. However, it is understood that these and other embodiments may be practiced without these specific details. For example, processes may be shown in diagrams in order not to obscure the embodiments in unnecessary detail. In other instances, well-known processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have many additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted via any suitable means including memory sharing, message passing, token passing, network transmission, etc.

While the principles of the disclosure have been described above in connection with specific methods, it is to be clearly understood that this description is made only by way of example and not as limitation on the scope of the disclosure. Whether now known or later discovered, there are countless other alternatives, variations and modifications of the many features of the various described and illustrated embodiments, both in the process and in the system characteristics, that will be evident to those of skill in the art after careful and discerning review of the foregoing descriptions, particularly if they are also able to review all of the various systems and methods that have been tried in the public domain or otherwise described in the prior art. All such alternatives, variations and modifications are contemplated to fall within the scope of the present invention.

Although the present invention has been described in terms of the foregoing preferred and alternative embodiments, these descriptions and embodiments have been provided by way of explanation of examples only, in order to facilitate understanding of the present invention. As such, the descriptions and embodiments are not to be construed as limiting the present invention, the scope of which is limited only by the claims of this and any related patent applications and any amendments thereto. Furthermore, it will be understood by those of skill in the art that any combination of embodiments, and capabilities associated with those embodiments, may be incorporated into one embodiment. By way of example only, one embodiment of the present invention may be capable of reliable, efficient assignment of adjusters using location information as well as assignment and management of automobile repair insurance claims, carrying out all or any combination of the functions of each of these described embodiments.

What is claimed is:

1. An automated system for objectively assigning resources based on real-time, dynamically updated geographic location data to reduce cycle time comprising:
   a plurality of mobile devices each associated with an available resource;
   one or more processors; and
   a computer-readable storage device coupled to the one or more processors and having instructions stored thereon which, when executed by the one or more processors, cause the one or more processors to perform operations comprising:
   receiving claim data regarding a loss event, the claim data comprising a location of the loss event;
   receiving, in real-time from each of the mobile devices, geographic location data comprising a current location for each of the mobile devices;
   providing a first user interface comprising a map comprising the location of the loss event, the current location for each of the mobile devices, and a geographic region delineated by an editable shape around the current location of each mobile device;
   processing the claim data and geographic location data through a resource matching algorithm to assign a resource from the available resources associated with the mobile devices to the loss event, the location of the loss event within the geographic region of an assigned resource, the resource matching algorithm weighted according to a set of objective criteria, wherein the set of objective criteria comprises weighted values assigned to resource data, each of the claim data, and the geographic location data; and
   providing a second user-interface allowing a user to input a modification to the set of objective criteria, wherein the modification comprises one or more of the following:
   assigning resources based on a value assigned to a loss event proportionally weighted to a customer rating of each of the respective resources; assigning resources based on an optimal geographic distance; and assigning resources based on a severity or a priority for the loss event; and
   providing, to the mobile device associated with the assigned resource, the assignment of the resource to the loss event.

2. The system of claim 1, wherein the operations comprise:
   providing, to the mobile device associated with the assigned resource, a location of the loss event and routing information to the location of the loss event.

3. The system of claim 1, wherein the claim data comprises a longitude and latitude of the loss event, a loss type, a severity of the loss event, a structure value of the loss event, and a number of stories or floors of an affected building.

4. The system of claim 1, wherein the resource data comprises: an availability of each of the resources, a pending workload for each of the resources, an efficiency rating for each of the resources, a skill rating for each of the resources, licensing information for each of the resources, certifications for each of the resources, and a customer service rating for each of the resources.

5. The system of claim 1, wherein geographic location data comprises the longitude and the latitude location of each of the mobile devices, wherein each of the mobile devices comprises a Global Positioning System (GPS), and wherein the geographic location data is received from the GPS system for each of the mobile devices.

6. The system of claim 1, wherein the set of objective criteria further comprises weighted values for a location of the loss event respective to the current location the mobile device, a time to get to a location of the loss event, claim type, qualifications need for the loss event, qualifications of the resource, a pending workload of the resource, and capacity of the resource, and wherein the qualifications of the resource comprise state licenses, availability, or military experience.

7. The system of claim 1, wherein the set of objective criteria is configured to assign a closest resource with a minimum certifications and skill level appropriate for the loss event.

8. The system of claim 1, wherein the resource is assigned until a final settlement or disposition of the loss event.

9. The system of claim 1, wherein the assigned resource is an internal desk adjuster, an internal field adjuster, an external field adjuster, a vendor, or a specialist.

10. The system of claim 1, wherein the resource matching algorithm assigns a plurality of the resources to the loss event.

11. The system of claim 1, wherein the operations further comprise:

determining a set of efficiency factors based on a plurality of assignments of received loss events to a respective resource selected from a pool of resources; and providing the set of efficiency factors to the user-interface.

12. The system of claim 1, wherein the claim data is provided by an intake model, and wherein the assignment of the resource to the loss event is provided through a resource model, and wherein the intake model and resource model are independently hosted.

13. The system of claim 1, wherein the operations further comprise:
after providing the assignment of the resource:
determining a time in repair (TIR) result for the loss event, and
reporting the TER result for the loss event to an insurer.

14. The system of claim 1, wherein the operations further comprise:
determining a forecasting based on the claim data and the assigned resources, wherein the forecasting comprises at least one of the following: a total number of required resources to cover the loss event, revenue generation, an indemnity for a client associated with the loss event, and an expense for the client associated with the loss event.

15. The system of claim 1, wherein the operations further comprise:
determining a status of at least one license or certifications of at least one of the resources; and
removing a resource from assignment consideration when the status is determined to be lapsed.

16. A computer-implemented method for resource assignment, the method being executed by one or more processors and comprising:
receiving claim data regarding a loss event, the claim data comprising a location of the loss event;
receiving, in real-time from each of the mobile devices, geographic location data comprising a current location for each of the mobile devices;
providing a first user interface comprising a map comprising the location of the loss event, the current location for each of the mobile devices, and a geographic region delineated by an editable shape around the current location of each mobile device;
processing the claim data and geographic location data through a resource matching algorithm to assign a resource from the available resources associated with the mobile devices to the loss event, the location of the loss event within the geographic region of an assigned resource, the resource matching algorithm weighted according to a set of objective criteria, wherein the set of objective criteria comprises weighted values assigned to resource data, each of the claim data, and the geographic location data; and
providing a second user-interface allowing a user to input a modification to the set of objective criteria, wherein the modification comprises one or more of the following:
assigning resources based on a value assigned to a loss event proportionally weighted to a customer rating of each of the respective resources; assigning resources based on an optimal geographic distance; and
assigning resources based on a severity or a priority for the loss event, and providing, to the mobile device associated with the assigned resource, the assignment of the resource to the loss event.

17. One or more non-transitory computer-readable storage media coupled to one or more processors and having instructions stored thereon which, when executed by the one or more processors, cause the one or more processors to perform operations comprising:
receiving claim data regarding a loss event, the claim data comprising a location of the loss event;
receiving, in real-time from each of the mobile devices, geographic location data comprising a current location for each of the mobile devices;
providing a first user interface comprising a map comprising the location of the loss event, the current location for each of the mobile devices, and a geographic region delineated by an editable shape around the current location of each mobile device;
processing the claim data and geographic location data through a resource matching algorithm to assign a resource from the available resources associated with the mobile devices to the loss event, the location of the loss event within the geographic region of an assigned resource, the resource matching algorithm weighted according to a set of objective criteria, wherein the set of objective criteria comprises weighted values assigned to resource data, each of the claim data, and the geographic location data; and
providing a second user-interface allowing a user to input a modification to the set of objective criteria, wherein the modification comprises one or more of the following: assigning resources based on a value assigned to a loss event proportionally weighted to a customer rating of each of the respective resources; assigning resources based on an optimal geographic distance; and
assigning resources based on a severity or a priority for the loss event, and providing, to the mobile device associated with the assigned resource, the assignment of the resource to the loss event.

* * * * *

UNITED STATES PATENT AND TRADEMARK OFFICE
CERTIFICATE OF CORRECTION

PATENT NO. : 11,151,658 B1
APPLICATION NO. : 16/551140
DATED : October 19, 2021
INVENTOR(S) : Cochran et al.

It is certified that error appears in the above-identified patent and that said Letters Patent is hereby corrected as shown below:

In the Claims

Column 17, Claim 16, Line 36 delete "the mobile devices" and replace with --a plurality of mobile devices each associated with an available resource--.

Column 18, Claim 17, Line 22 delete "the mobile devices" and replace with --a plurality of mobile devices each associated with an available resource--.

Signed and Sealed this
Eighteenth Day of October, 2022

Katherine Kelly Vidal
*Director of the United States Patent and Trademark Office*